United States Patent
Cho et al.

(10) Patent No.: US 7,667,805 B2
(45) Date of Patent: Feb. 23, 2010

(54) ARRAY SUBSTRATE AND DISPLAY PANEL HAVING THE SAME

(75) Inventors: Seon-Ah Cho, Busan (KR); Jae-Jin Lyu, Gyeonggi-do (KR); Ji-Won Sohn, Seoul (KR); Jin-Won Park, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 52 days.

(21) Appl. No.: 11/809,466

(22) Filed: May 31, 2007

(65) Prior Publication Data

US 2007/0236622 A1    Oct. 11, 2007

(30) Foreign Application Priority Data

Jun. 1, 2006    (KR)    ...................... 10-2006-0049208

(51) Int. Cl.
*G02F 1/1337* (2006.01)

(52) U.S. Cl. ....................................... 349/129; 349/139

(58) Field of Classification Search .................. 349/129, 349/139
See application file for complete search history.

(56) References Cited

U.S. PATENT DOCUMENTS

| 7,403,253 | B2 * | 7/2008 | Kang | .......................... 349/141 |
| 2008/0158455 | A1 * | 7/2008 | Yoo et al. | ...................... 349/38 |
| 2008/0204613 | A1 * | 8/2008 | Kim et al. | ...................... 349/33 |

FOREIGN PATENT DOCUMENTS

CN    1612023 A    5/2005

* cited by examiner

*Primary Examiner*—Frank G Font
*Assistant Examiner*—Eric Wong
(74) *Attorney, Agent, or Firm*—Innovation Counsel LLP

(57) ABSTRACT

An array substrate includes a pixel electrode, a thin-film transistor (TFT) and a storage line. The pixel electrode has a first electrode portion, a second electrode portion and a connecting electrode portion to electrically connect the first and second electrode portions to each other. The second electrode portion is spaced apart from the first electrode portion by a predetermined distance in a first direction. The TFT is electrically connected to the pixel electrode to drive the pixel electrode. The storage line overlaps a portion of the pixel electrode and has an asymmetric connecting electrode closer to the second electrode portion than to the first electrode portion.

20 Claims, 9 Drawing Sheets

ARRAY SUBSTRATE AND DISPLAY PANEL HAVING THE SAME

CROSS-REFERENCE TO RELATED APPLICATIONS

This application claims priority to Korean Patent Application No. 10-2006-49208 filed on Jun. 1, 2006 in the Korean Intellectual Property Office (KIPO), the contents of which are herein incorporated by reference in their entirety.

BACKGROUND OF THE INVENTION

1. Field of the Invention

The present invention relates to an array substrate and a display panel having the array substrate. More particularly, the present invention relates to an array substrate capable of improving display quality, and a display panel having the array substrate.

2. Description of the Related Art

In general, a liquid crystal display (LCD) apparatus includes an LCD panel to display an image using optical and electrical properties of liquid crystal, and a backlight assembly that is disposed below the LCD panel and provides the display panel with light.

The LCD apparatus further includes an upper polarizing plate disposed on the LCD panel and a lower polarizing plate disposed under the LCD panel. A polarizing axis of the upper polarizing plate is substantially perpendicular to that of the lower polarizing plate.

The LCD panel includes an array substrate, an opposing substrate and a liquid crystal layer interposed between the array substrate and the opposing substrate. The array substrate includes a plurality of thin-film transistors (TFT) and a plurality of pixel electrodes, and the opposing substrate includes a common electrode.

The pixel electrodes are arranged in a matrix configuration on the array substrate, and each of the pixel electrodes has a substantially rectangular shape when viewed from a plan view. The common electrode is formed on the entire surface of the opposing substrate.

Examples of operating modes of the LCD panel include a twisted nematic (TN) mode, an in-plane switch (IPS) mode, and a vertical alignment (VA) mode. An LCD panel employing the VA mode has advantages, such as a relatively high response speed.

Furthermore, the VA mode having a plurality of domains, such as a patterned vertical alignment (PVA) mode, a multi-domain vertical alignment (MVA) mode, has been developed in order to improve viewing angle characteristics. An electric field is formed in each of the domains, and the electric field in a first domain has a direction different from a direction of the electric field in a second domain adjacent to the first domain. Thus, liquid crystal molecules of the liquid crystal layer are aligned in directions different from each other so that viewing angle characteristics are improved. For example, the liquid crystal molecules are aligned upward, downward, right and left to improve the viewing angle characteristics.

When the electric fields have directions different from each other, the electric fields affect each other in a boundary between the electric fields. Thus, the liquid crystal molecules in the electric field are hindered from being aligned in a direction of the electric field. Particularly, when the liquid crystal molecules are aligned in a direction that is substantially in parallel with the polarizing axis of the upper polarizing plate or the polarizing axis of the lower polarizing plate, a dark region is generated.

SUMMARY OF THE INVENTION

The present invention provides an array substrate capable of improving display quality.

The present invention also provides a display panel having the above-mentioned array substrate.

In one aspect of the present invention, an array substrate includes a pixel electrode, a thin-film transistor (TFT) and a storage line.

The pixel electrode has a first electrode portion, a second electrode portion and a connecting electrode portion to electrically connect the first and second electrode portions to each other. The second electrode portion is spaced apart from the first electrode portion by a predetermined distance in a first direction. The TFT is electrically connected to the pixel electrode to drive the pixel electrode. The storage line is overlapped with a portion of the pixel electrode and has an asymmetric connecting electrode closer to the second electrode portion than to the first electrode portion. The asymmetric connecting electrode may extend in a second direction substantially parallel with the first direction.

For example, the storage line may further have a pair of main storage electrodes that extend in the first direction and overlap with ends of the pixel electrode in the second direction and are connected to each other through the asymmetric connecting electrode.

In another aspect of the present invention, a display panel includes an array substrate, an opposing substrate and a liquid crystal layer.

The array substrate includes a pixel electrode, a TFT and a storage line. The pixel electrode has a first electrode portion, a second electrode portion and a connecting electrode portion to electrically connect the first and second electrode portions to each other. The second electrode portion is spaced apart from the first electrode portion by a predetermined distance in a first direction. The TFT is electrically connected to the pixel electrode to drive the pixel electrode. The storage line is overlapped with a portion of the pixel electrode and has an asymmetric connecting electrode closer to the second electrode portion than to the first electrode portion.

The opposing substrate includes a common electrode and a first domain-dividing portion. The common electrode faces the array substrate. The first domain-dividing portion extends in the first direction and is overlapped with the first electrode portion. The opposing substrate may further include a second domain-dividing portion that is overlapped with the second electrode portion and extends in a second direction substantially parallel with the first direction. Each of the first and second domain-dividing portions may include an opening formed by removing a portion of the common electrode and/or a protrusion formed on a portion of the common electrode.

The liquid crystal layer includes liquid crystal molecules interposed between the array substrate and opposing substrate.

According to the above, a storage line includes an asymmetric connecting electrode closer to a second electrode portion than to a first electrode portion. Thus, the effect of an undesired electric field on the first region may be prevented and/or reduced. Therefore, a dark region caused in a pixel unit may be prevented and/or reduced so that display quality is improved.

BRIEF DESCRIPTION OF THE DRAWINGS

The above and other advantages of the present invention will become readily apparent by reference to the following detailed description when considered in conjunction with the accompanying drawings wherein.

DESCRIPTION OF THE EMBODIMENTS

Figure 1:
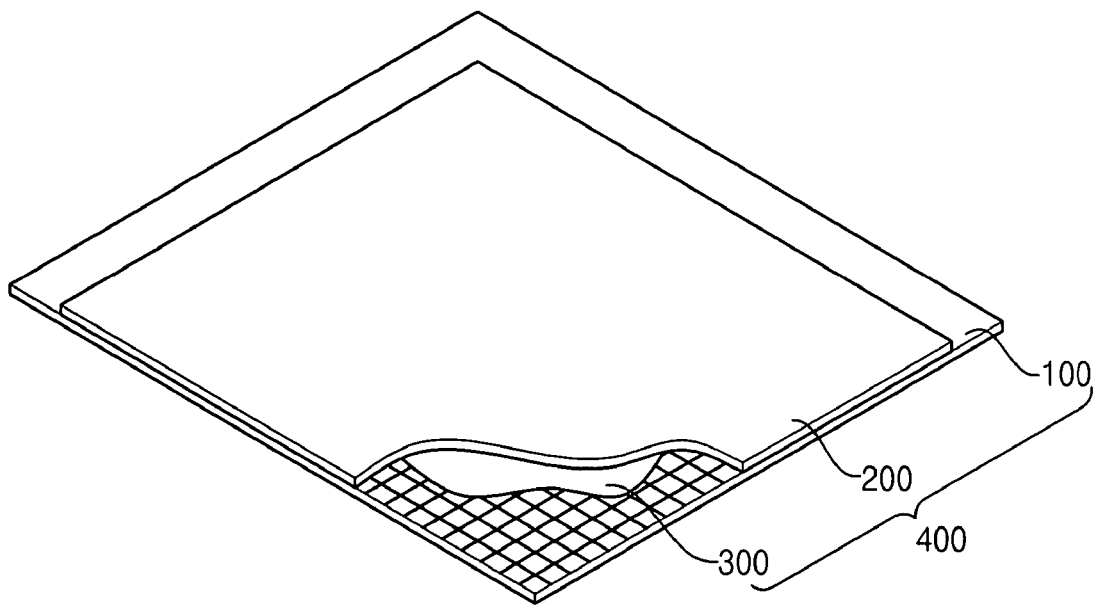
FIG. 1 is a perspective view illustrating a display panel according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on,""directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a perspective view illustrating a display panel according to an exemplary embodiment of the present invention.

Referring to FIG. 1, a display panel 400 includes an array substrate 100, an opposing substrate 200 and a liquid crystal layer 300 to display an image using light.

The array substrate 100 includes a plurality of pixel electrodes arranged in a matrix configuration, a plurality of thin-film transistors (TFT) applying a driving voltage to the pixel electrodes and a plurality of signal lines to operate the TFTs.

The opposing substrate 200 faces the array substrate 100. The opposing substrate 200 includes a common electrode and a plurality of color filters. The common electrode faces the array substrate 100 and includes a transparent conductive material. The color filters correspond to the pixel electrodes. The color filters may include, for example, a red color filter, a green color filter and a blue color filter.

The liquid crystal layer 300 is interposed between the array substrate 100 and the opposing substrate 200 and is aligned by an electric field formed between the pixel electrode and the common electrode. The liquid crystal layer 300 which is aligned by the electric field controls a light transmittance of light incident onto the liquid crystal layer 300, and then the light passes through the color filter thereby displaying an image.

Figure 2:
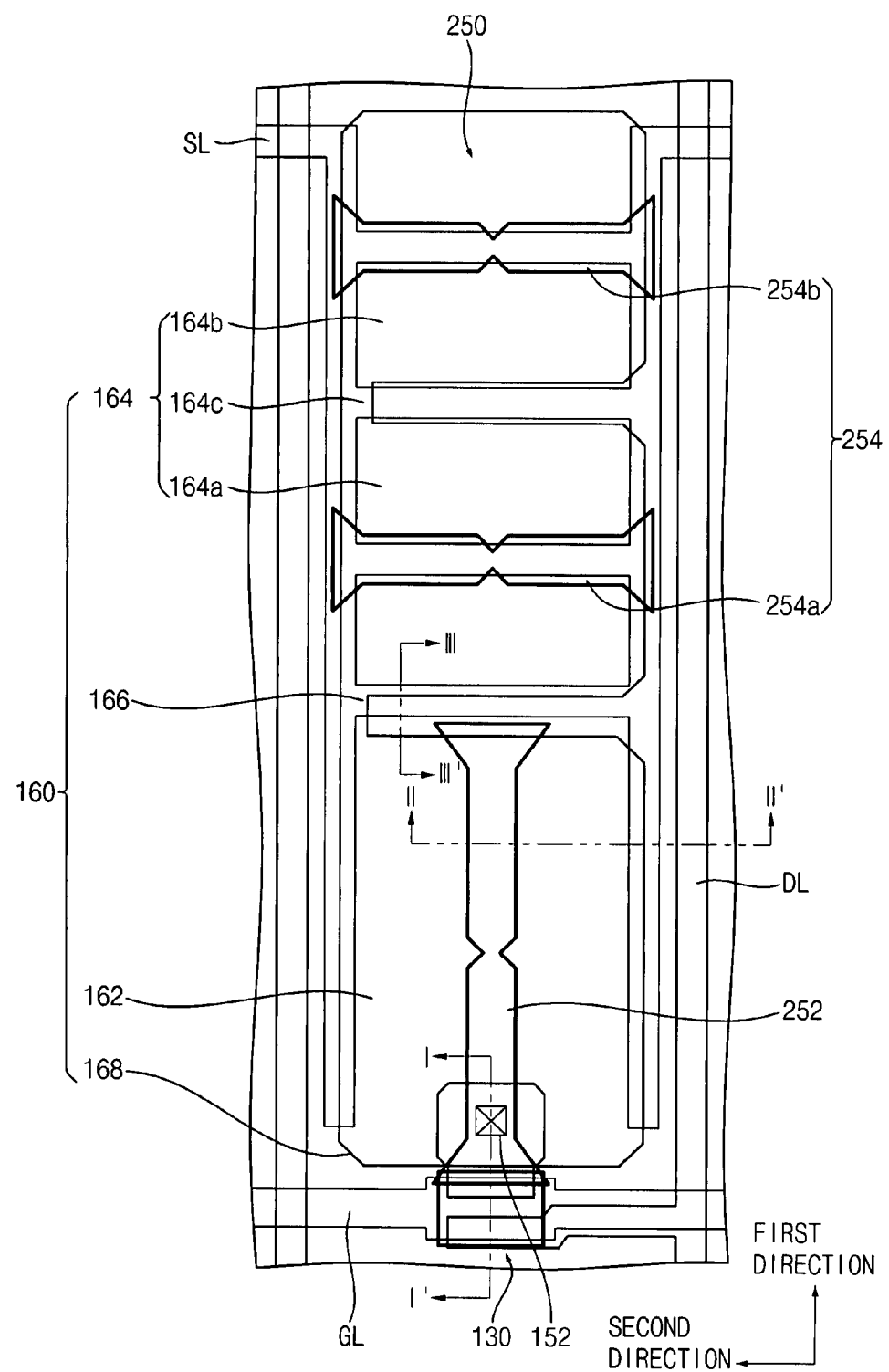
FIG. 2 is a plan view illustrating a pixel unit of the display panel illustrated in FIG. 1.
Figure 3:
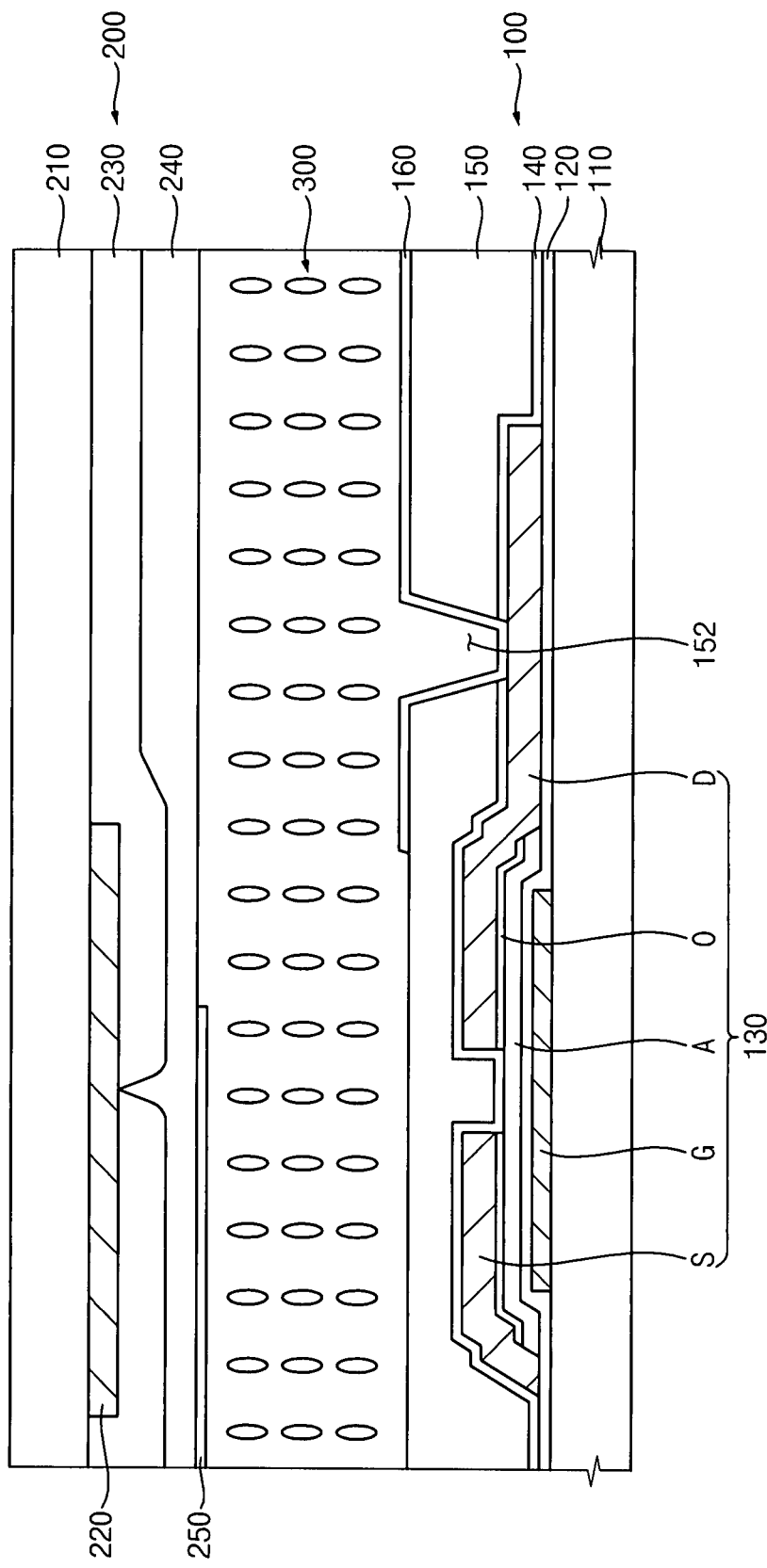
FIG. 3 is a cross-sectional view taken along a line I-I' of FIG. 2.
Figure 4:
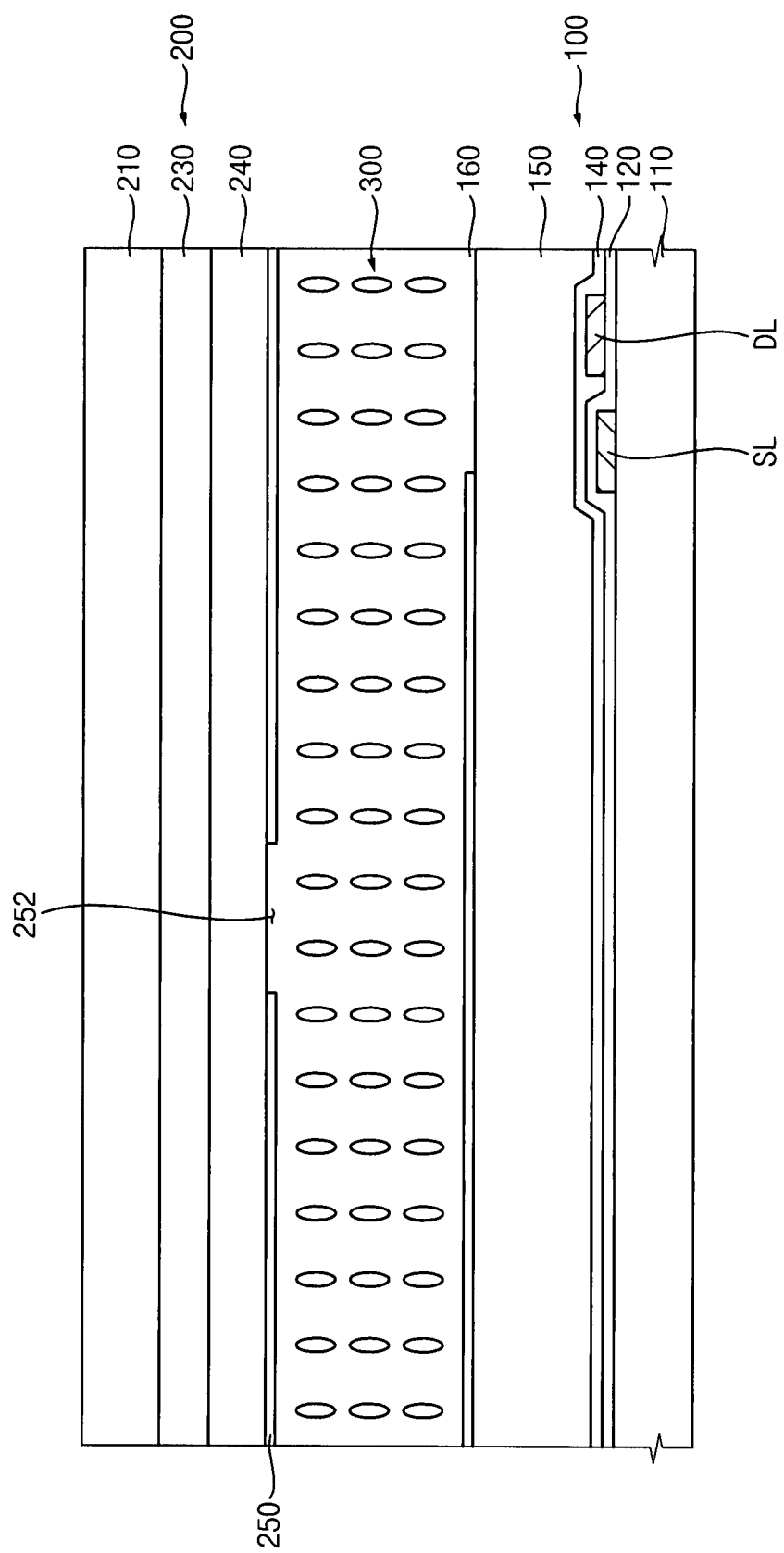
FIG. 4 is a cross-sectional view taken along a line II-II' of FIG. 2.
Figure 5:
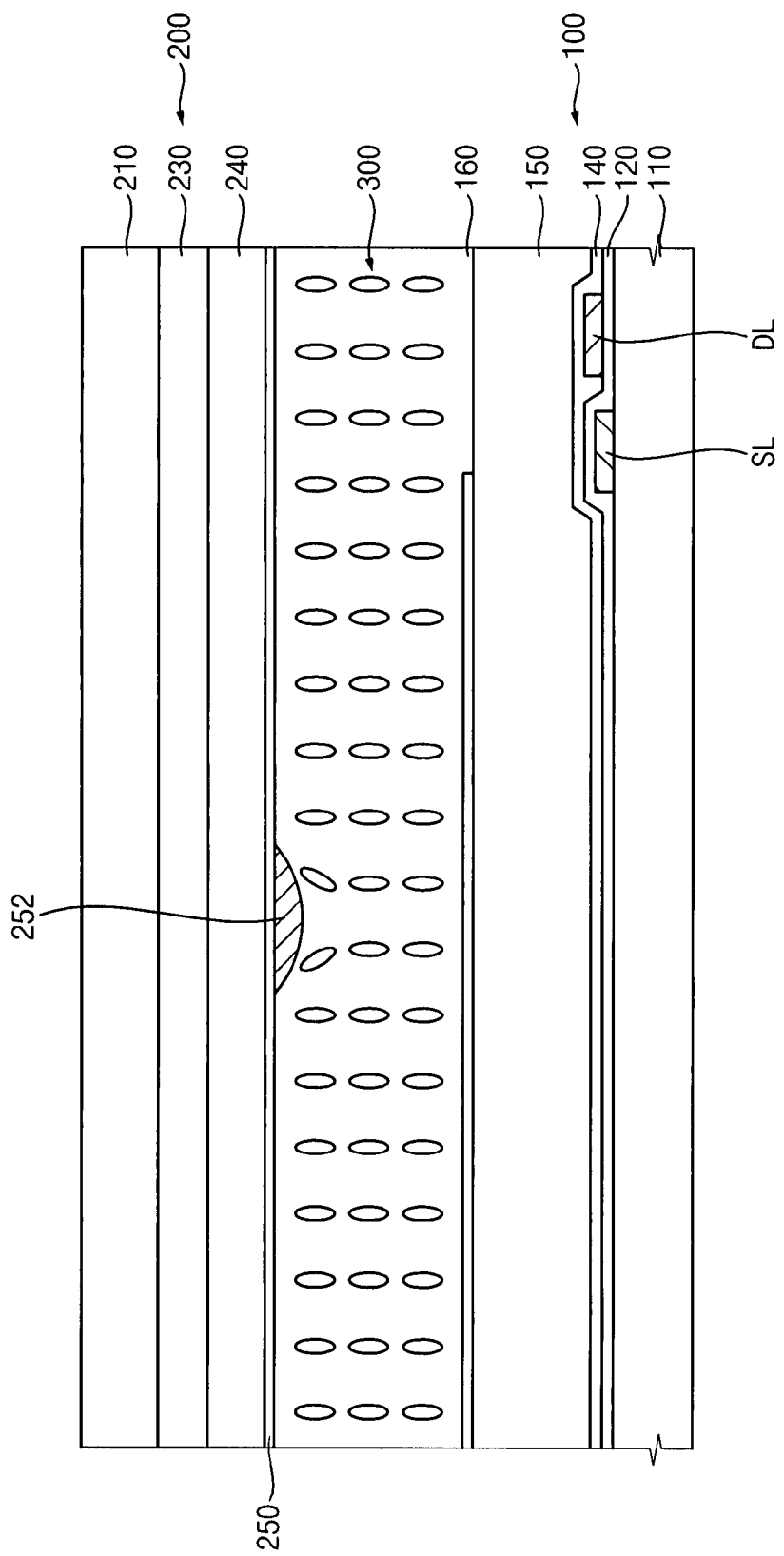
FIG. 5 is a cross-sectional view illustrating a display panel according to another exemplary embodiment of the present invention.

FIG. 2 is a plan view illustrating a pixel unit of the display panel illustrated in FIG. 1. FIG. 3 is a cross-sectional view taken along a line I-I' of FIG. 2. FIG. 4 is a cross-sectional view taken along a line II-II' of FIG. 2. FIG. 5 is a cross-sectional view illustrating a display panel according to another exemplary embodiment of the present invention.

Referring to FIGS. 2 to 5, the display panel 400 includes the array substrate 100, the opposing substrate 200 and the liquid crystal layer 300.

The array substrate 100 includes a first transparent substrate 110, a gate line GL, a data line DL, a storage line SL, a gate-insulating layer 120, a TFT 130, a protecting layer 140, an organic insulating layer 150 and a pixel electrode 160.

The first transparent substrate 110 has a plate shape and is comprised of a transparent material. Examples of the transparent material may include glass, quartz, sapphire, and a transparent synthetic resin.

The data line DL is substantially perpendicular to the gate line GL. Particularly, the data line DL extends in a first direction, and a plurality of the data lines DL is arranged in a row in a second direction substantially perpendicular to the first direction. The gate line GL extends in the second direction to cross the data line DL, and a plurality of the gate lines GL is arranged in a row in the first direction. A plurality of pixels is defined by the gate lines GL and the data lines DL. The TFT 130 and the pixel electrode 160 are formed in each of the pixels.

The gate line GL is formed on the first transparent substrate 110. The storage line SL is formed on the first transparent substrate 110. The storage line SL is explained more fully below with reference to an auxiliary drawing.

The gate-insulating layer 120 is formed on the first transparent substrate 110 to cover the gate line GL and the storage line SL. The data line DL is formed on the gate-insulating layer 120 and is insulated from the gate line GL.

The TFT 130 includes a gate electrode G, a source electrode S, a drain electrode D, an active layer A and an ohmic contact layer O.

The gate electrode G extends from the gate line GL in the first direction. For example, the gate electrode G may extend from the gate line GL in the first direction and in a direction opposite to the first direction so that the gate electrode G has a rectangular shape when viewed from a plan view.

The active layer A is formed above the gate electrode G. Particularly, the active layer A is formed on the gate-insulating layer 120 to be overlapped with the gate electrode G. For example, the active layer A may include a semiconductor material, such as amorphous silicon (a-Si).

The source electrode S extends from the data line DL in the second direction, and overlaps with a portion of the active layer A. The drain electrode D is spaced apart from the source electrode S by a predetermined distance and extends in the first direction. A portion of the drain electrode D is overlapped with a portion of the active layer A.

The ohmic contact layer O is formed between the active layer A and the source electrode S and between the active layer A and the drain electrode D. For example, the ohmic contact layer O may include amorphous silicon into which $n^+$ impurities are implanted at a high concentration. The ohmic contact layer O may reduce a contact resistance between the active layer A and the source electrode S and between the active layer A and the drain electrode D.

The protecting layer 140 is formed on the gate-insulating layer 120 to cover the TFT 130. Thus, the protecting layer 140 may prevent the TFT 130 from being damaged physically and/or chemically. The organic insulating layer 150 is formed on the entire surface of the protecting layer 140 to planarize a surface of the array substrate 100. Furthermore, a contact hole 152 is formed on a portion of the drain electrode D. Particularly, a portion of the protecting layer 140 and a portion of the organic insulating layer 150 are removed through an etching process to form the contact hole 152.

The pixel electrode 160 is formed in each of the pixels and on the organic insulating layer 150. The pixel electrode 160 is electrically connected to the drain electrode D through the contact hole 152. For example, the pixel electrode 160 may include a transparent conductive material, such as indium tin oxide (ITO), indium zinc oxide (IZO), and amorphous indium tin oxide (a-ITO).

The pixel electrode 160 includes a first electrode portion 162, a second electrode portion 164 and a connecting electrode portion 166. The second electrode portion 164 is spaced apart from the first electrode portion 162 by a predetermined distance in the first direction. The connecting electrode portion 166 electrically connects the first electrode portion 162 to the second electrode portion 164. The pixel electrode 160 is explained below more fully with reference to an auxiliary drawing.

The opposing substrate 200 includes a second transparent substrate 210, a light-blocking layer 220, a color filter 230, a planarizing layer 240, a common electrode 250, a first domain-dividing portion 252 and a second domain-dividing portion 254.

The second transparent substrate 210 may have a plate shape substantially the same as the first transparent substrate 110 and may include a transparent material.

The light-blocking layer 220 is formed on a portion of the second transparent substrate 210 and faces the array substrate 100 to block light. For example, the light-blocking layer 220 may be overlapped with the gate line GL, the data line DL and the TFT 130.

The color filter 230 is formed on the second transparent substrate 210 to cover the light-blocking layer 220. The color filter 230 is overlapped with the each of the pixel electrodes 250 formed in the pixels. Examples of the color filter 230 may include a red color filter, a green color filter, a blue color filter.

The planarizing layer 240 is formed on the color filter 230 to planarize a surface of the opposing substrate 200. The planarizing layer 240 may include a transparent organic material having an insulating characteristic.

The common electrode 250 is formed on the planarizing layer 240. The common electrode 250 may include a transparent conductive material substantially the same as the pixel electrode 160.

The first domain-dividing portion 252 overlaps with the first electrode portion 162, and the second domain-dividing portion 254 overlaps the second electrode portion 164. Each of the first and second domain-dividing portions 252 and 254 may include an opening formed by removing a portion of the common electrode 250. Alternatively, each of the first and second domain-dividing portions 252 and 254 may comprise a protrusion formed on a portion of the common electrode 250 as illustrated in FIG. 5. The common electrode 250 and the first and second domain-dividing portions 252 and 254 are explained more fully below with reference to an auxiliary drawing.

Figure 6:
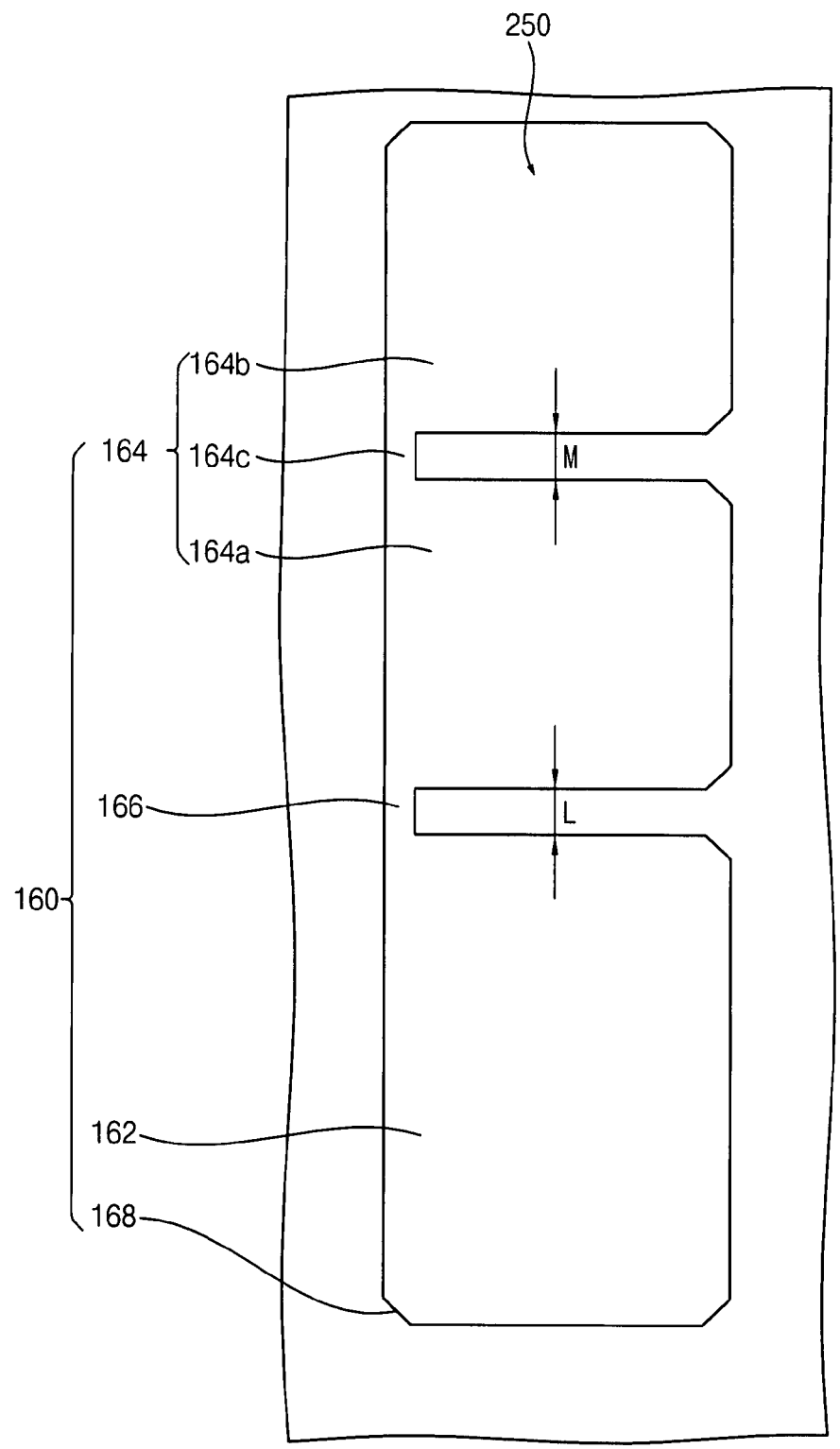
FIG. 6 is a plan view illustrating a pixel electrode of the pixel unit illustrated in FIG. 2.

FIG. 6 is a plan view illustrating the pixel electrode of the pixel unit illustrated in FIG. 2.

Referring to FIGS. 2 and 6, the pixel electrode 160 is formed in the pixel unit and includes the first electrode portion 162, the second electrode portion 164 and the connecting electrode portion 166.

The first electrode portion 162 is spaced apart from the gate line GL by a predetermined distance in the first direction. The first electrode portion 162 is electrically and directly connected to the drain electrode D of the TFT 130 through the contact hole 152.

The second electrode portion 164 is spaced apart from the first electrode portion 162 by a predetermined distance in the first direction. This distance is indicated by the letter L. The connecting electrode portion 166 is disposed between the first and second electrode portions 162 and 164 to electrically connect the first and second electrode portions 162 and 164 to each other.

Each of the first and second electrode portions 162 and 164 may have a substantially rectangular shape when viewed from a plan view. An edge of each of the first and second electrode portions 162 and 164 may be removed to form a cut-out portion 168. The cut-out portion 168 may be tilted with respect to the first and/or second direction by a predetermined angle, for example, about 45 degrees.

The second electrode portion 164 may include a plurality of main electrodes. For example, the second electrode portion 164 may include a first main electrode 164a, a second main electrode 164b and a sub-connecting electrode 164c.

The first main electrode 164a is spaced apart from the first electrode portion 162 by a predetermined distance L in the first direction. The first main electrode 164a is electrically connected to the first electrode portion 162 through the connecting electrode portion 166. The first main electrode 164a may have a substantially rectangular shape when viewed from a plan view.

The second main electrode 164b is spaced apart from the first main electrode 164a by a predetermined distance M in the first direction. The second main electrode 164b may have a substantially rectangular shape when viewed from a plan view.

The sub-connecting electrode 164c is disposed between the first and second main electrodes 164a and 164b to electrically connect the first and second main electrodes 164a and 164b.

Figure 7:
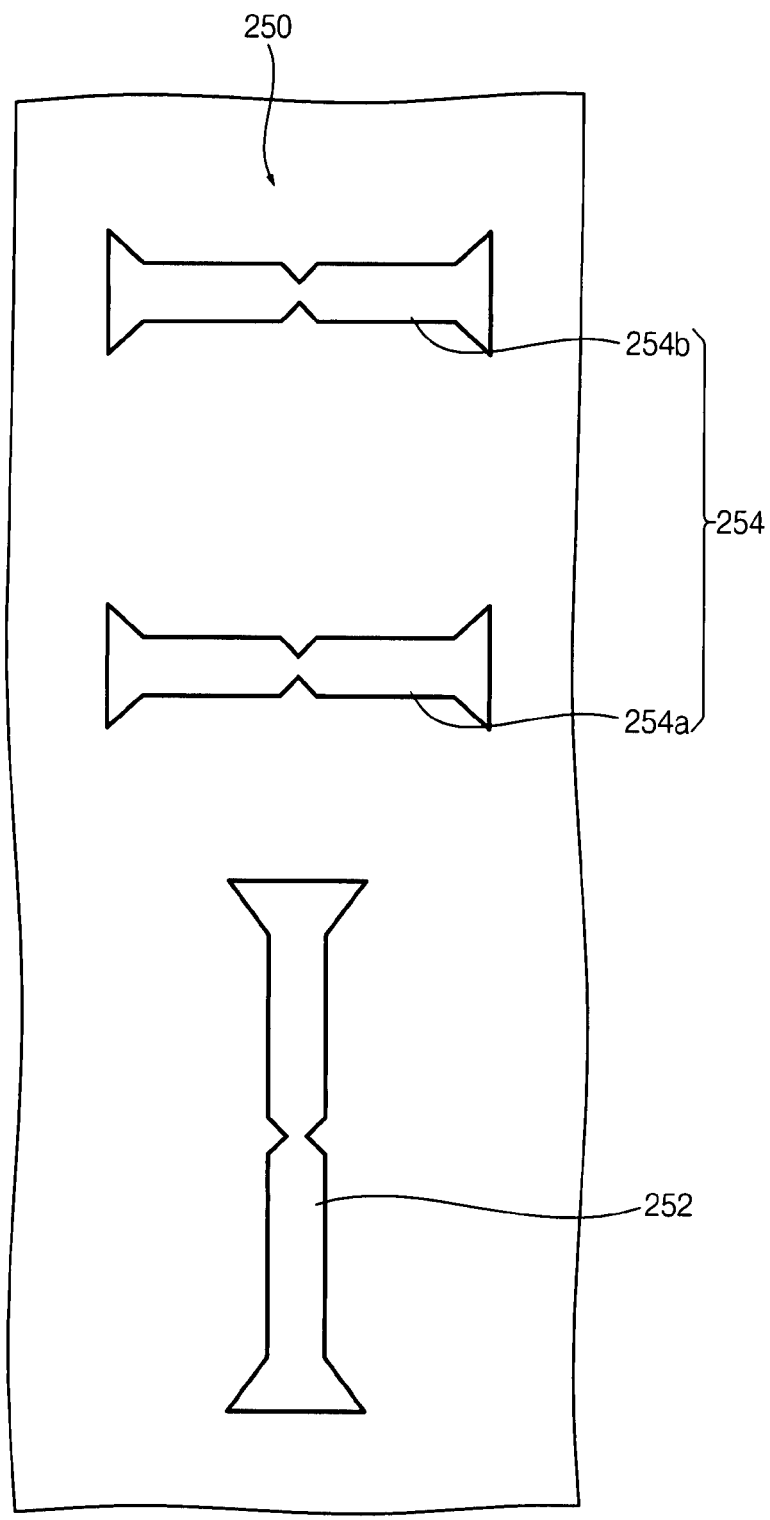
FIG. 7 is a plan view illustrating a common electrode of the pixel unit illustrated in FIG. 2.

FIG. 7 is a plan view illustrating the common electrode of the pixel unit illustrated in FIG. 2.

The common electrode 250 and the first and second domain-dividing portions 252 and 254 are explained more fully with reference to FIGS. 2 and 7.

The common electrode 250 has the first and second domain-dividing portions 252 and 254. Each of the first and second domain-dividing portions 252 and 254 may include an opening formed created by removing a portion of the common electrode 250. Alternatively, each of the first and second domain-dividing portions 252 and 254 may comprise a protrusion that is formed on a portion of the common electrode 250 and has a predetermined height.

The first domain-dividing portion 252 overlaps the first electrode portion 162 and extends in the first direction. For example, the first domain-dividing portion 252 may cross a central portion of the first electrode portion 162. An end portion of the first domain-dividing portion 252 in the first direction may have a trapezoidal shape that is symmetric in the second direction. Furthermore, a central portion of the first domain-dividing portion 252 may be recessed in the second direction and in a direction opposite to the second direction to form recesses having a substantially triangular shape.

The second domain-dividing portion 254 overlaps with the second electrode portion 164 and extends in the second direction. Since the second electrode portion includes a plurality of the main electrodes, the second domain-dividing portion 254 includes a plurality of sub-dividing portions corresponding to the main electrodes. For example, the second domain-dividing portion 254 may include a first sub-dividing portion 254a and a second sub-dividing portion 254b.

The first sub-dividing portion 254a overlaps the first main electrode 164a and extends in the second direction. Particularly, the first sub-dividing portion 254a may be overlapped with a central portion of the first main electrode 164a and may cross the first main electrode 164a in the second direction.

The second sub-dividing portion 254b overlaps the second main electrode 164b and extends in the second direction. Particularly, the second sub-dividing portion 254b may be overlapped with a central portion of the second main electrode 164b and may cross the second main electrode 164b in the second direction.

An end portion of each of the first and second sub-dividing portions 254a and 254b in the second direction may have a trapezoidal shape that is symmetric in the first direction. Furthermore, a central portion of each of the first and second sub-dividing portions 254a and 254b may be recessed in the first direction and in a direction opposite to the first direction to form recesses having a substantially triangular shape.

The TFT 130 may be adjacent to the first domain-dividing portion 252. Particularly, the TFT 130 overlaps with an end portion of the first domain-dividing portion 252, which is adjacent to the gate line GL. Furthermore, the contact hole 152 may be overlapped with the end portion of the first domain-dividing portion 252.

Figure 8:
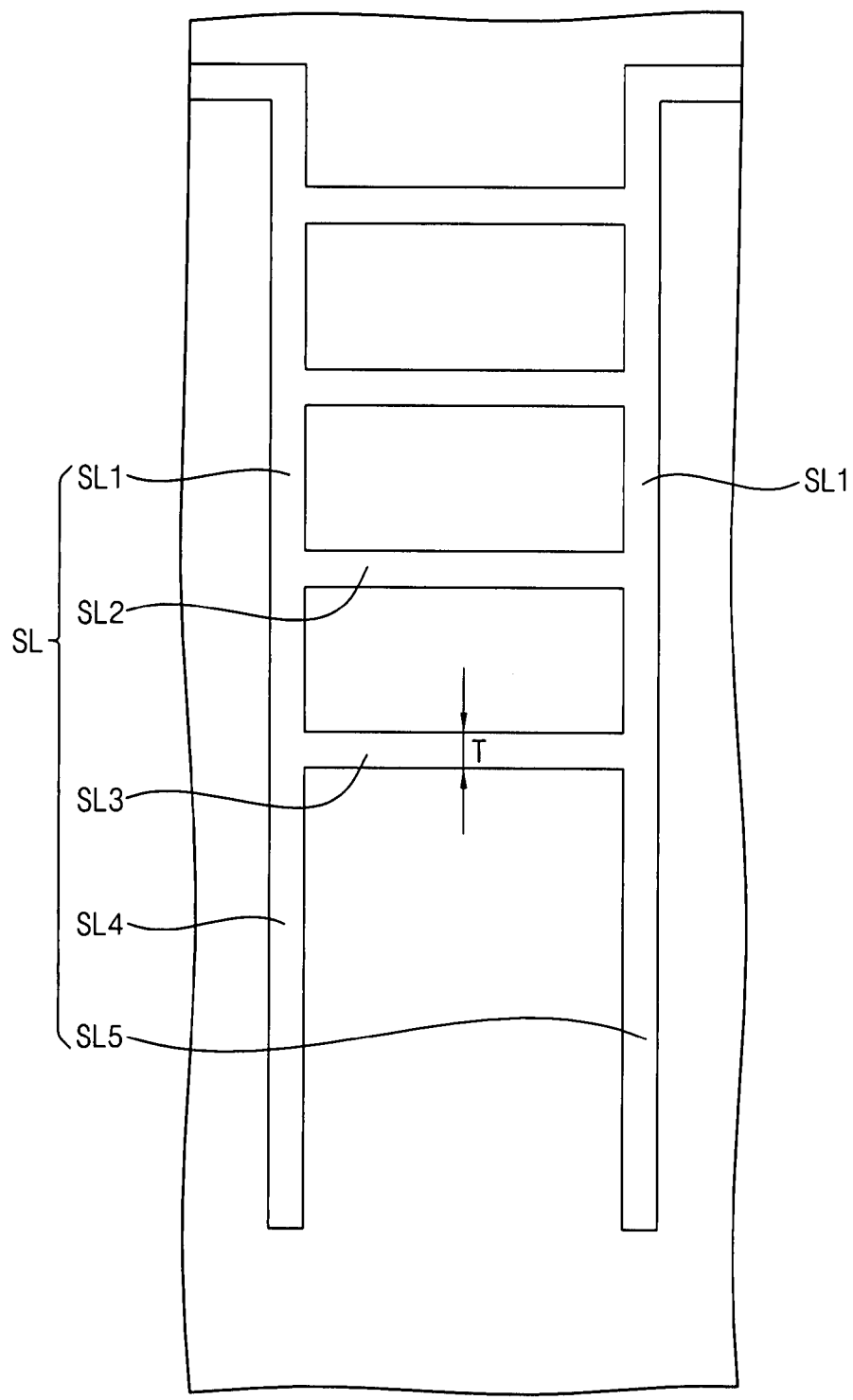
FIG. 8 is a plan view illustrating a storage line of the pixel unit illustrated in FIG. 2.

FIG. 8 is a plan view illustrating the storage line of the pixel unit illustrated in FIG. 2.

Hereinafter, the storage line SL will be explained more fully with reference to FIGS. 2 and 8.

The storage line SL overlaps a portion of the pixel electrode 160 and includes a main storage electrode SL1, a connecting storage electrode SL2 and an asymmetric connecting electrode SL3. Electrode portions SL3, SL4 and SL5 form a U-shaped portion of storage line SL. This U-shaped portion is associated with first electrode portion 162 of pixel electrode 160.

For example, the storage line SL may include a pair of the main storage electrodes SL1. Each of the main storage electrodes SL1 extends in the first direction and overlaps an end portion of the pixel electrode 160. One of the main storage electrodes SL1 is electrically connected to the remaining one of the main storage electrodes SL1.

The connecting storage electrode SL2 extends in the second direction and connects the main storage electrodes SL1 to each other. The connecting storage electrode SL2 may be disposed between the first and second main electrodes 164a and 164b, or may be overlapped with the second domain-dividing portion 254. Since the second domain-dividing portion 254 includes the first and second dividing portions 254a and 254b, the storage line SL may include a plurality of the connecting storage electrodes SL2 to correspond to the first and second dividing portions 254a and 254b. For example, the storage line SL may include three connecting storage electrodes SL2.

The asymmetric connecting electrode SL3 extends in the second direction and connects the main storage electrodes SL1 to each other. The asymmetric connecting electrode SL3 is formed between the first and second electrode portions 162 and 164 when viewed from a plan view, and the asymmetric connecting electrode SL3 is closer to the second electrode portion 164 than to the first electrode portion 162. The term "asymmetric" of the asymmetric connecting electrode SL3 means that the asymmetric connecting electrode SL3 is closer to the second electrode portion 164 than to the first electrode portion 162.

Figure 9:
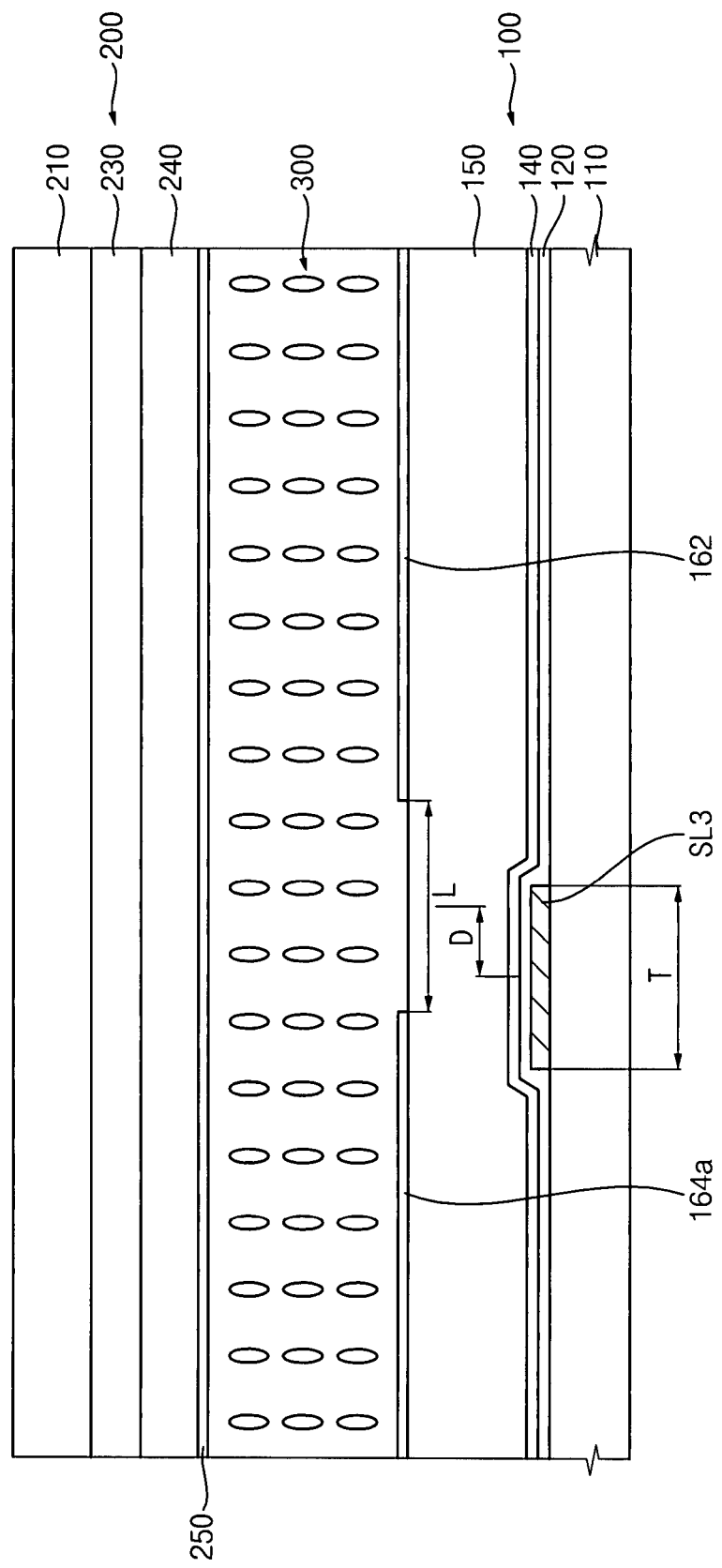
FIG. 9 is a cross-sectional view taken along a line III-III' of FIG. 2.

FIG. 9 is a cross-sectional view taken along a line III-III' of FIG. 2.

Hereinafter, the asymmetric connecting electrode SL3 is explained more fully with reference to FIG. 9.

A distance between the first and second electrode portions 162 and 164, particularly, a distance L between the first electrode portion 162 and the first main electrode 164*a* may be about 6 μm to about 10 μm. Furthermore, a width T of the asymmetric connecting electrode SL3 in the first direction may be about 3 μm to about 6 μm.

The asymmetric connecting electrode SL3 is closer to the second electrode portion 164 than to the first electrode portion 162. Particularly, a first central line of the asymmetric connecting electrode SL3, which is substantially in parallel with the second direction, is spaced apart from a second central line of a gap between the first and second electrode portions 162 and 164. For example, a distance D between the first and second central lines may be about 1 μm to about 5 μm when viewed from a plan view.

Hereinafter, an alignment of liquid crystal molecules of the display panel according to an exemplary embodiment of the present invention is explained.

Referring to FIG. 2, the pixel unit of the display panel 400 includes a first region and a second region. An electric field substantially parallel with the second direction is formed on the first region to align liquid crystal molecules on the first region in the second direction. An electric field substantially parallel with the first direction is formed on the second region to align liquid crystal molecules on the second region in the first direction.

Particularly, the first electrode portion 162 and the first domain-dividing portion 252 are disposed on the first region. The first domain-dividing portion 252 extends in the first direction to cross the central portion of the first electrode portion 162. Thus, a first electric field substantially parallel with the second direction is formed on the first region to align the liquid crystal molecules on the first region in the second direction.

The second electrode portion 164 and the second domain-dividing portion 254 are disposed on the second region. The second domain-dividing portion 254 extends in the second direction to cross the central portion of the second electrode portion 164. Thus, a second electric field substantially parallel with the first direction is formed on the second region to align the liquid crystal molecules on the second region in the first direction.

The first and second electric fields may affect each other on a boundary region between the first and second regions. Particularly, the first electric field may be strongly affected by the second electric field on an end portion of the first region, which is adjacent to the second region. Thus, liquid crystal molecules on the end portion of the first region, which is adjacent to the second region, may not be aligned in the second direction, but be aligned in the first direction or in a direction tilted with respect to the second direction by a predetermined angle. Thus, a dark region may be formed on the end portion of the first region, which is adjacent to the second region.

In this embodiment, the storage line SL includes the asymmetric connecting electrode SL3 closer to the second electrode portion 164 than to the first electrode portion 162. Thus, the effect of the second electric field on the first electric field on the end portion of the first region, which is adjacent to the second region, may be prevented and/or reduced.

Particularly, about 5V of a voltage may be applied to the pixel electrode 160, and about 0V of a voltage may be applied to the common electrode 250 and the storage line SL. When the asymmetric connecting electrode SL3 is closer to the first electrode portion 162 than to the second electrode portion 164, or is disposed symmetrically with respect to a central line of a gap between the first and second electrode portions 162 and 164, the first electric field may be strongly structurally affected by the second electric field.

However, when the asymmetric connecting electrode SL3 is closer to the second electrode portion 164 than to the first electrode portion 162, a gap between equipotential surfaces becomes smaller. Thus, the effect of the second electric field on the first electric field may be prevented and/or reduced.

According to the above, a storage line includes an asymmetric connecting electrode closer to a second electrode portion than to a first electrode portion. Thus, the effect of an undesired electric field on the first region may be prevented and/or reduced. Therefore, a dark region caused in a pixel unit may be prevented and/or reduced so that display quality is improved.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An array substrate comprising:
   a pixel electrode having a first electrode portion, a second electrode portion and a connecting electrode portion electrically connecting the first and second electrode portions, an edge of the second electrode portion being spaced apart from an edge of the first electrode portion by a predetermined distance in a first direction;
   a thin-film transistor (TFT) electrically connected to the pixel electrode; and
   a storage line which overlaps with a portion of the pixel electrode, wherein the storage line includes a connecting electrode positioned closer to the second electrode portion than to the first electrode portion, wherein the connecting electrode overlaps with the second electrode portion.

2. The array substrate of claim 1, wherein the connecting electrode extends in a second direction substantially perpendicular to the first direction.

3. The array substrate of claim 1, wherein a distance between the spaced apart edges of the first and second electrode portions is from about 6 μm to about 10 μm.

4. The array substrate of claim 2, wherein a width of the connecting electrode is about from 3 μm to about 6 μm.

5. The array substrate of claim 4, wherein a central line of the connecting electrode, which is substantially parallel with the first direction, is spaced apart from a central line of a gap between the first and second electrode portions by from about 1 μm to about 5 μm.

6. The array substrate of claim 5, wherein the storage line further has a pair of main storage electrodes that extend in the first direction and overlap with ends of the pixel electrode in the second direction and are connected to each other through the connecting electrode.

7. The array substrate of claim 6, wherein the second electrode portion comprises:
   a first main electrode;

a second main electrode spaced apart from the first main electrode by a predetermined distance in the first direction; and a sub-connecting electrode which connects the first to the second main electrodes.

8. The array substrate of claim 7, wherein the storage line further has a connecting storage electrode that extends in the second direction and connects the main storage electrodes to each other and is disposed between the first and second main electrodes when viewed from a plan view.

9. The array substrate of claim 8, further comprising:

a data line that extends in the first direction and is electrically connected to the TFT;

a gate line that extends in a second direction substantially perpendicular to the first direction and is electrically connected to the TFT.

10. The array substrate of claim 9, wherein the TFT is electrically connected to the first electrode portion.

11. A display panel comprising:

an array substrate that comprises a pixel electrode, a storage line and a TFT, the pixel electrode having a first electrode portion, a second electrode portion and a connecting electrode portion electrically connecting the first and second electrode portions, and edge of the second electrode portion being spaced apart from an edge of the first electrode portion by a predetermined distance in a first direction, the storage line overlapping a portion of the pixel electrode, the TFT driving the pixel electrode, wherein the storage line includes a connecting electrode positioned closer to the second electrode portion than to the first electrode portion;

an opposing substrate spaced apart from the array substrate, the opposing substrate comprising a common electrode having a first domain-dividing portion, the common electrode facing the array substrate, the first domain-dividing portion extending in the first direction and overlapping the first electrode portion;

a liquid crystal layer comprising liquid crystal molecules interposed between the array substrate and the opposing substrate, wherein the connecting electrode overlaps with the second electrode portion.

12. The display panel of claim 11, wherein the connecting electrode extends in the second direction.

13. The display panel of claim 12, wherein the storage line further has a pair of main storage electrodes that extend in the first direction and overlap with ends of the pixel electrode in the second direction and are connected to each other through the connecting electrode.

14. The display panel of claim 13, wherein the opposing substrate further comprises a second domain-dividing portion which extends in the second direction and overlaps with the second electrode portion, and wherein the first domain-dividing portion crosses the first electrode portion in the first direction and overlaps a central portion of the first electrode portion, and the second domain-dividing portion crosses the second electrode portion in the second direction and overlaps a central portion of the second electrode portion.

15. The display panel of claim 14, wherein the storage-line further has a connecting storage electrode that extends in the second direction and connects the main storage electrodes to each other and is overlapped with the second domain-dividing portion.

16. The display panel of claim 15, wherein the TFT is overlapped with an end portion of the first domain-dividing portion.

17. The display panel of claim 16, wherein each of the first and second domain-dividing portions comprises an opening formed by removing a portion of the common electrode.

18. The display panel of claim 15, wherein each of the first and second domain-dividing portions comprises a protrusion formed on a portion of the common electrode.

19. The array substrate of claim 1, wherein the connecting electrode does not overlap with the first electrode portion.

20. The array substrate of claim 11, wherein the connecting electrode does not overlap with the first electrode portion.

* * * * *